United States Patent [19]

Papadopoulos

[11] Patent Number: 5,386,586
[45] Date of Patent: Jan. 31, 1995

[54] SYSTEM AND METHOD FOR CONSTRUCTION OF LISTS OF DEFERRED SERVICE REQUESTS

[75] Inventor: Gregory M. Papadopoulos, Arlington, Mass.

[73] Assignee: Massachusetts Institute of Technology, Cambridge, Mass.

[21] Appl. No.: 176,497

[22] Filed: Dec. 28, 1993

Related U.S. Application Data

[63] Continuation of Ser. No. 396,926, Aug. 21, 1989, abandoned.

[51] Int. Cl.$^6$ .............................................. G06F 9/46
[52] U.S. Cl. .................................. 395/800; 364/238.4; 364/281.8; 364/281.3; 364/284; 364/DIG. 1; 395/650
[58] Field of Search .............. 395/375, 550, 650, 800; 364/131, 133

[56] References Cited

U.S. PATENT DOCUMENTS

| | | | |
|---|---|---|---|
| 4,387,427 | 6/1983 | Cox | 395/650 |
| 4,809,159 | 2/1989 | Sowa | 395/800 |
| 4,829,467 | 5/1989 | Ogata | 364/900 |
| 4,841,436 | 6/1989 | Asano | 395/250 |
| 4,943,916 | 7/1990 | Asano | 395/375 |
| 4,989,133 | 1/1991 | May | 395/550 |
| 5,029,080 | 7/1991 | Otsuki | 395/375 |
| 5,263,161 | 11/1993 | Barth | 395/650 |

OTHER PUBLICATIONS

R. S. Nikhil: "Can dataflow subsume von Neumann computing?", Computer Architecture Conference Proceedings, vol. 17, No. 3, Jun. 1989, ACM (Washington, US), pp. 262-272.

A. P. W. Bohm et al., "Hardware and software enhancement of the Manchester dataflow machine" Digest of Papers from Comcon Spring 85, 25-28 Feb. 1985, pp. 420-423.

J.-L. Gaudiot, "Structure handling in data-flow systems" IEEE Transactions on Computers, vol. C-35, No. 6, Jun. 1986, IEEE, New York, U.S., pp. 489-502.

R. M. Keller et al., "An Architecture for a Loosely-coupled Parallel Processor," UUCS-78-105, Department of Computer Science, University of Utah (Oct. 1978).

*Primary Examiner*—Eric Coleman
*Attorney, Agent, or Firm*—Hamilton, Brook, Smith & Reynolds

[57] ABSTRACT

In a data processing system, multiple requests for a service are stored on a deferred list formed out of already allocated memory space. Specifically, a received service request is added to the deferred list by altering the request as dictated by a stated convention. Preferably, the convention mandates that an instruction pointer of the received service request is decremented or otherwise manipulated. The altered received service request then is exchanged for a sevice request currently held at the service. The altering and exhanging are performed atomically. The service request that was previously held for the service is sent to the head of the current deferred list. It is preferred that the deferred list be formed out of activation frames.

23 Claims, 4 Drawing Sheets

10 ⟨I-fetch x [20], ⟨$IP_1$, $FP_1$⟩⟩

12 ⟨I-fetch x [20], ⟨$IP_2$, $FP_2$⟩⟩

14 ⟨I-fetch x [20], ⟨$IP_3$, $FP_3$⟩⟩

SYSTEM AND METHOD FOR CONSTRUCTION OF LISTS OF DEFERRED SERVICE REQUESTS

The Government has rights in this invention pursuant to contract Number N00014 84-K-0099 awarded by the Department of the Navy.

This is a continuation of co-pending application Ser. No. 07/396,926 filed on Aug. 21, 1989, now abandoned.

Related Patent Applications

The subject matter of this patent application is related to U.S. patent application, "Implementation of a General Purpose Dataflow Multiprocessor," by Papadopoulos et al., Ser. No. 07/274,498, filed on Nov. 18, 1988, now abandoned, and U.S. Pat. No. 5,241,635 entitled "Tagged Token Data Processing System With Operand Matching In Activation Frames," by Papadopoulos et al., issued Aug. 31, 1993 on U.S. patent application Ser. No. 07/396,480 which is a Continuation-in-Part of U.S. patent application Ser. No. 07/274,498. The present application and the related applications are all assigned to the Massachusetts Institute of Technology.

BACKGROUND OF THE INVENTION

In multiprocessing systems, plural service requests may often be concurrently pending for a single service. A typical example of such concurrently pending service requests are multiple fetch requests for an empty memory location. The problem presented by such service requests is one of synchronization. Each service request must be granted access to the service in a synchronized manner.

One prevalent approach utilized with data flow processing systems to remedy the problem of synchronizing fetch requests is the use of I-structures. The I-structures provide a mechanism wherein pending fetch requests can be added on to a deferred list while waiting for a value to be written into the memory location. In particular, each memory location contains a state field that indicates the current state of the memory location. If multiple requests are pending for an empty memory location, the memory location is put into a deferred state and points to a deferred list of fetch requests. These fetch requests are serviced when a write request arrives to the memory location. I-structures are discussed in more detail in Arvind and R. E. Thomas, *I-Structures an Efficient Data Type for Parallel Machines*, technical memo TM-187, Massachusetts Institute of Technology Laboratory for Computer Science, Cambridge, Mass., September 1980.

SUMMARY OF THE INVENTION

The present invention provides a method of constructing a list of deferred service requests. These service requests are made from multiple threads of computation for a specified service. When a service request is received for this service, the request is altered as dictated by a stated convention. Having altered the received service request, the data processing system then replaces a service request currently held for the service with the altered received service request. This service request that was previously held for the service is then stored at a memory location at the head of a current deferred list. This deferred list may be empty or may comprise at least one previously received service request. In either case, the memory location at which the service request is stored has already been allocated to the thread of computation that made the more recent service request. Moreover, the memory location address is specified by the more recently received service request.

In the preferred embodiment, the service requests comprise requests for fetches from a memory location. Each service request should include an instruction pointer to a destination instruction. These deferred lists are ideal for data flow processing systems especially tagged token processing systems.

The convention that is used to alter a received service request may be any of a number of different operations. A preferred operation is to decrement the instruction pointer of the service request. Another option is merely to toggle a bit in the instruction pointer. This toggling of the bit is a more easily performed operation than the decrementing operation.

If the memory location starts off in an empty state indicating that no value is currently at the memory location, then, the first service request to arrive is stored directly in the memory location. Later, when a subsequent fetch request arrives the previously described altering, replacing and storing steps are performed.

The above described steps of creating a deferred list can also be thought of as a method of generating a list of destination addresses. Specifically, when viewed as such, the first step of the method is to store a return destination address from a first message in the memory location. The next return destination address for the next message is modified to point to an instruction specified by the next destination address. The prior return destination address is then replaced with the modified next destination address and forwarded as an input to a next instruction. These steps are repeated when subsequent messages arrive. The modifying step and storing step are performed atomically.

After the list is constructed, it is eventually serviced. It is preferred that all of the deferred service requests be serviced at once when the service becomes available. Further, it is preferred that they are serviced in Last-In-First-Out order. Hence, the preferred list acts as a stack, and the deferred service requests are serviced by traversing this stack-like list.

The data processing system that performs these operations is comprised of at least one processor for performing threads of computation. It also is comprised of a memory comprised of at least one memory unit for the use by the at least one processor. In addition, a service is included as well as a service control means to manage the service. The service preferably provides fetches from memory and the service control means, is therefore, preferably a memory controller.

Such a data processing system is capable of managing fetches to a memory location. Each memory location comprises a state field to store the current state of the memory location and a value field for storing a value. In particular, when a fetch request for a memory location is received by a data processing system it examines the state field of the memory location. If the current state is a present state indicating that a value is present in the value field, the value is sent to a destination specified by the fetch request. However, if the current state is an empty state indicating that a value is not present in the value field, the fetch request is stored in the value field of the memory location. In addition, the state field is changed to indicate that the memory location is in a deferred state.

Suppose, on the other hand, that the current state of the memory location is a deferred state. In that case, when a fetch request arrives it is added on to a deferred list, and the state field is changed to indicate that the memory location is in a deferred list state. The memory location may also be in a deferred list state prior to the arrival of the fetch request. If the memory location is in such a deferred list state, the fetch request is altered and added on to the deferred list.

The present invention includes an instruction that is very useful in implementing the deferred list. The instruction has two operands: a value and a destination. This instruction passes the two operands as a token to a processor specified by the destination. It also passes the value on to the next instruction.

As was mentioned previously, the deferred list of the present invention is ideal for use in a data flow processing system. When a data flow processing system is used, the deferred list is created from activation frame locations. In particular, service requests that were held for the service are added on to the deferred list by being stored in activation frame locations that comprise the deferred list. The net result of this approach is the creation of a list of pointers in plural activation frames, and a pointer to the head of the list of pointers held in a memory location.

DETAILED DESCRIPTION OF THE PREFERRED EMBODIMENT

The preferred embodiment of the present invention concerns a means of building a deferred list of fetch requests in a data flow processing system. In particular, the deferred fetch list is formed when multiple outstanding fetch requests are waiting for a data value to arrive at a memory location. The deferred list is formed from previously allocated memory space in a simple manner that can be readily implemented with little overhead.

Figure 1:
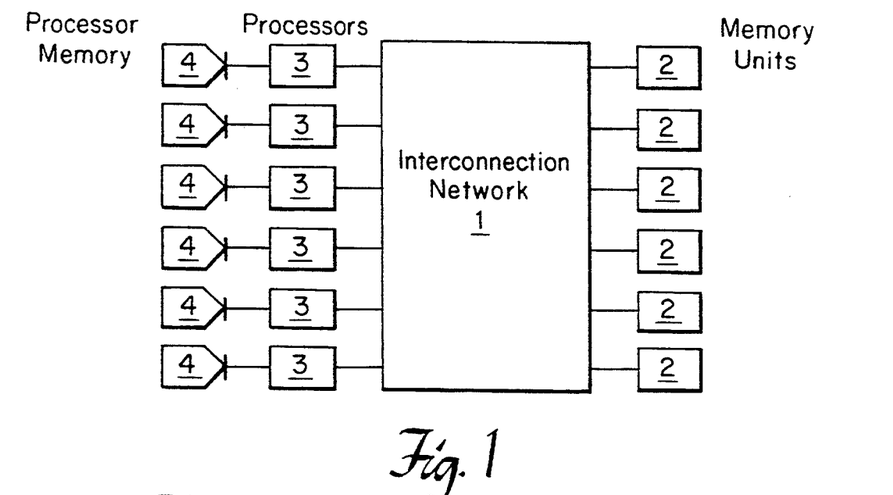
FIG. 1 illustrates the major components of the data flow processing system.

FIG. 1 shows the major components of the data flow processing system of the preferred embodiment. This data flow processing system includes a plurality of parallel processors 3 that are interconnected via an interconnection network 1. It also includes a plurality of memory units 2 that are provided for the processing elements 3. The memory units 2 are interconnected by the interconnection network 1. The interconnection network 1 allows each processing element 3 to communicate with any other processing element 3 as well as with any memory unit 2. In addition, a separate portion of memory 4 is associated with each processing element 3. This memory 4 includes activation frames having presence bits.

As a data flow processing system, the data processing system of the preferred embodiment executes data flow graphs. The data flow graphs it executes are comprised of edges and nodes. The edges represent operands and the nodes represent operations to be performed on the instructions. The operands control scheduling of the execution of instructions. In particular, an instruction is executed only when all of the operands of the instruction are available. A problem posed by such a scheduling scheme is that operands usually do not become available at the same time. Typically, one operand arrives before the others. Hence, to operate effectively the system must have a means of holding the early arriving operands while waiting for the remaining operands to arrive. In the preferred embodiment, activation frames provide such a mechanism. They store early arriving operands while the system is waiting for the remaining operands to arrive. The activation frames in memory 4 are able to indicate the empty and presence states of each of their memory locations. These activation frames are held within the memory 4 spaces assigned to the various processing elements 3. Also stored in these memory 4 spaces are sections of code also referred to herein as code blocks, routines, or threads of computation, to direct operation of the processing elements 3. An activation frame is allocated for each routine that is performed. In particular, once a routine is to be called, the activation frame is allocated. This allocation is performed by the operating system. The operating system maintains a list of free activation frames such that when a request for a new activation frame is received, it simply pops an activation frame off the free list and assigns it to the call of the routine. Moreover, when the call to the routine is completed, the activation frame is added back on to the free list. In performing such allocations and deallocations, the operating system makes certain that the same activation frame is not assigned to multiple routine calls at the same time.

In the preferred system, each activation frame is processed by a specific processing element, and each processing element may be allocated thousands of activation frames. Since the activation frames are allocated as required and requested with execution of prior code blocks, the processing elements are called upon dynamically with execution of the code. Further details of the preferred configuration of the data flow processing system are described in U.S. Pat. No. 5,241,635 by Papadopoulos et al., issued Aug. 31, 1993, on U.S. patent application Ser. No. 07/396,480 which is a Continuation-in-Part of U.S. patent application No. 07/274,498, now abandoned.

Figure 2:
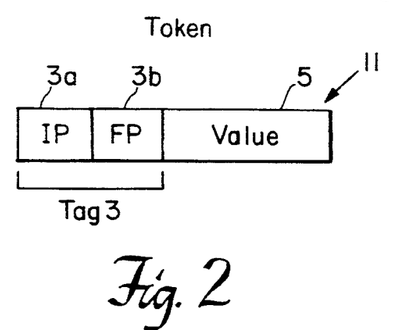
FIG. 2 illustrates a token.

The data flow processing system is preferably a special variety of data flow processing system known as a tagged token processing system. It operates on data structures known as tokens that generate activities when processed by the processing elements 3. As FIG. 2 illustrates, these tokens 11 are comprised of a tag field 3 and a value field 5. The value field 5 holds a data value. The tag field, in contrast, holds an instruction pointer 3a designated as IP and a frame pointer 3b designated as FP. The instruction pointer 3a points to the memory address in the assigned memory 4 where the instruction specified by the instruction pointer 3a is held. In processing a token, a processing element 3 uses this instruction pointer 3a to fetch the desired instruction. The frame pointer 3b, however, is used to point to an activation frame. Within the activation frame it points to the location where the operands of the instruction to which the instruction pointer points are matched. The fetched instruction contains an offset that is used to specify the memory location within an activation frame where the operands of the instruction are matched. Typically, the location is specified by adding the offset to the frame pointer 3b.

Each processing element 3 maintains a local token queue in which it stores a plurality of tokens that it processes. Each processing element 3 clocks in a new token from the token queue into the processing element 3 every clock cycle of a system clock. Within the processing element 3, execution is attempted of the instruction pointed to by the instruction pointer 3a of the token 11. Often, however, to complete execution of an instruction such as a fetch instruction, it is necessary to access the memory units 2. In such cases, the processing element 3 generates a new token that it sends to the appropriate memory unit 2. Once generated, new tokens exit the processing elements 3 and travel across the interconnection network 1 to the appropriate memory unit 2.

The data flow processing system of the preferred embodiment has multiple processing elements 3 that act in parallel. Since each of these processing elements 3 may issue memory requests, a case may arise where multiple requests are made for the same memory location. Of particular concern is the instance in which multiple fetch requests are received prior to a write to a memory location. The preferred embodiment of the present invention provides a mechanism whereby such multiple fetch requests may be stored on a deferred list in an efficient manner until they can be serviced. These fetch requests are serviced in such a manner that the processing elements 3 need not wait while the request is being serviced by the memory unit 2. The waiting is avoided because each memory unit 2 has a separate memory controller that can independently service the requests, and if required, the memory controller can return data to the processing elements in a suitable token 11 so as to initiate further action.

The tokens 11 that are sent to the memory units 2 specify in their instruction pointer 3a the type of operation to be performed; their frame pointer 3b specifies the memory location at which the operation is to be performed. If the token 11 specifies a fetch request, the token 11 stores a return address in its value field 5. The return address which is also a tag indicates where the value that is fetched from memory 2 is to be sent after it has been fetched. However, if the token 11 is a write request, the value field 5 holds the value to be written into the memory location.

Figure 3:
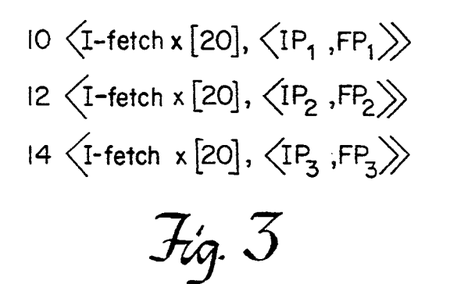
FIG. 3 illustrates some sample tokens encoding fetch requests.
Figure 4A:
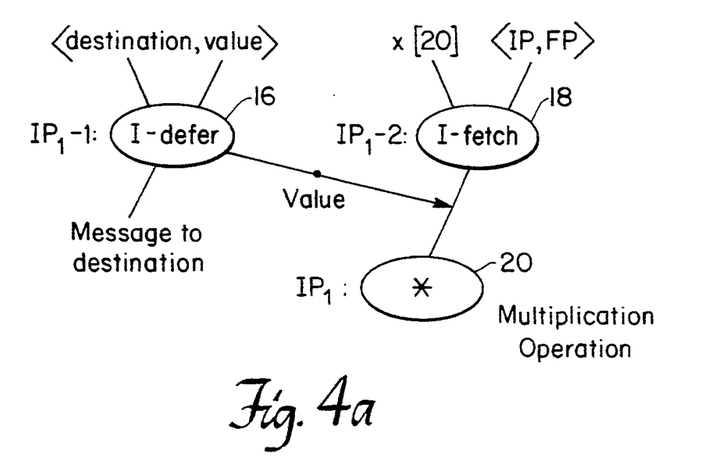
FIGS. 4a, 4b and 4c illustrate data flow graphs of the sample tokens.
Figure 4B:
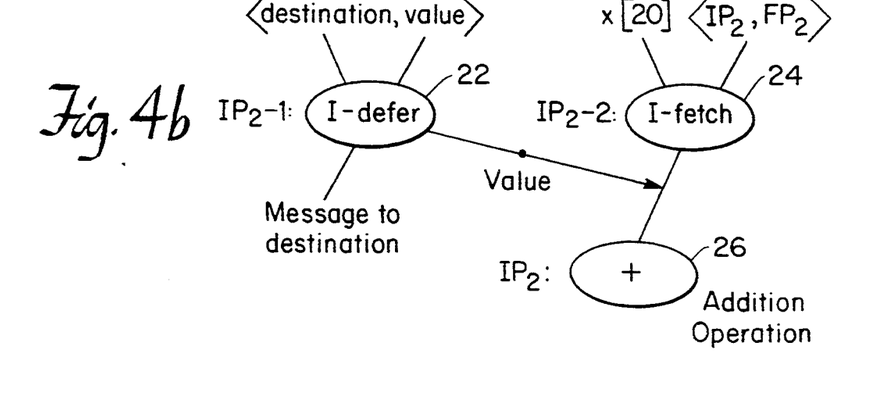
Figure 4C:
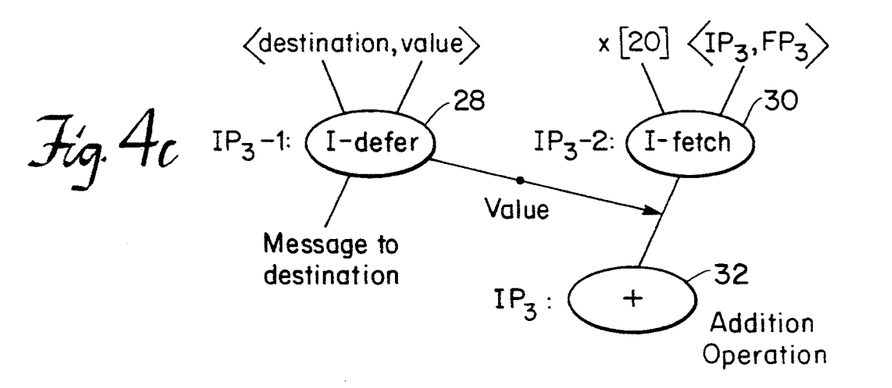

To illustrate how the deferred lists are formed and managed, suppose that the three tokens 10, 12 and 14 shown in FIG. 3 are received by a memory unit 2. Further, suppose that they are processed in the order shown (i.e. 10 is processed first, 12 is processed second, and 14 is processed last). All three requests are fetch request for the same memory location x[20]. FIGS. 4a, 4b and 4c show the corresponding data flow graphs for the tokens. As can be seen in these figures, when an I-fetch instruction is compiled the compiler automatically places an I-defer instruction in the code at a fixed location relative to the operation that would otherwise follow the I-fetch instruction. For example, in FIG. 4a, the multiplication operation at instruction address IP follows the I-fetch operation at IP-2 in the normal data flow. To implement the present approach of deferred list building, an additional operation, I-defer, is included at IP-1. The output edges of the I-fetch 18 and I-defer 16 both terminate at the same input to the multiplication node 20. As discussed below, the I-defer is always included in order to process deferred lists in the event of multiple requests to an empty memory location. The arithmetic instructions shown as nodes 20, 26 and 32 are included merely for illustrative purposes.

Figure 5:
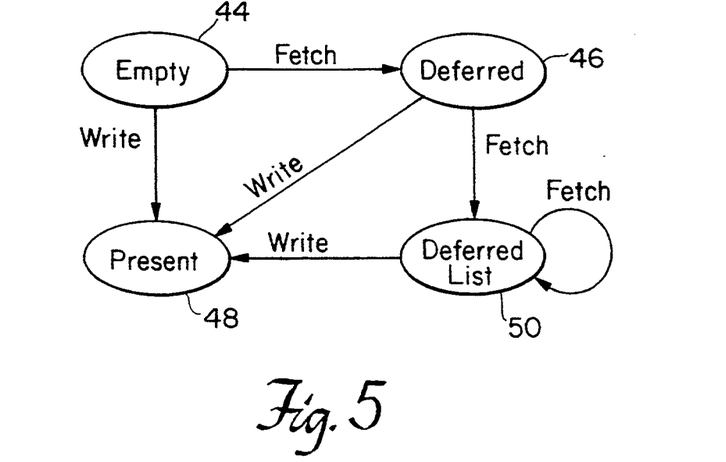
FIG. 5 illustrates a state diagram of the states memory location may assume.

In typical operation, if a token 11 specifying an I-fetch instruction is received by a memory unit 2, the memory controller of the memory unit 2 examines the memory location that is sought by the fetch instruction. In particular, it examines the current state of the memory location. The action that the memory controller next takes is dictated by the state of the memory location. FIG. 5 shows the four states 44, 46, 48 and 50 which the memory location may assume in a preferred embodiment. It should be noted that the deferred list state 50 need not be included; rather, a deferred state 46 alone is sufficient. For illustrative purposes, however, suppose that a deferred list state 50 is included. If the memory location is in an empty state 44, the memory location is changed to a deferred state 46. Moreover, the destination address for the fetch request is written into the memory location. If the memory location is in a deferred state 46, the state of the memory location is changed to a deferred list state 50, and the return address of the received fetch request is added on to the deferred list as will be described below. Similarly, if the memory location is already in a deferred list state 50, the fetch request is added on to the deferred list.

Suppose, however, that a token 11 specifying a write as opposed to a fetch is received. In that case, regardless of the current state of the memory location, the state of the memory location is changed to the present state 48 and any deferred service requests are handled.

Figure 6:
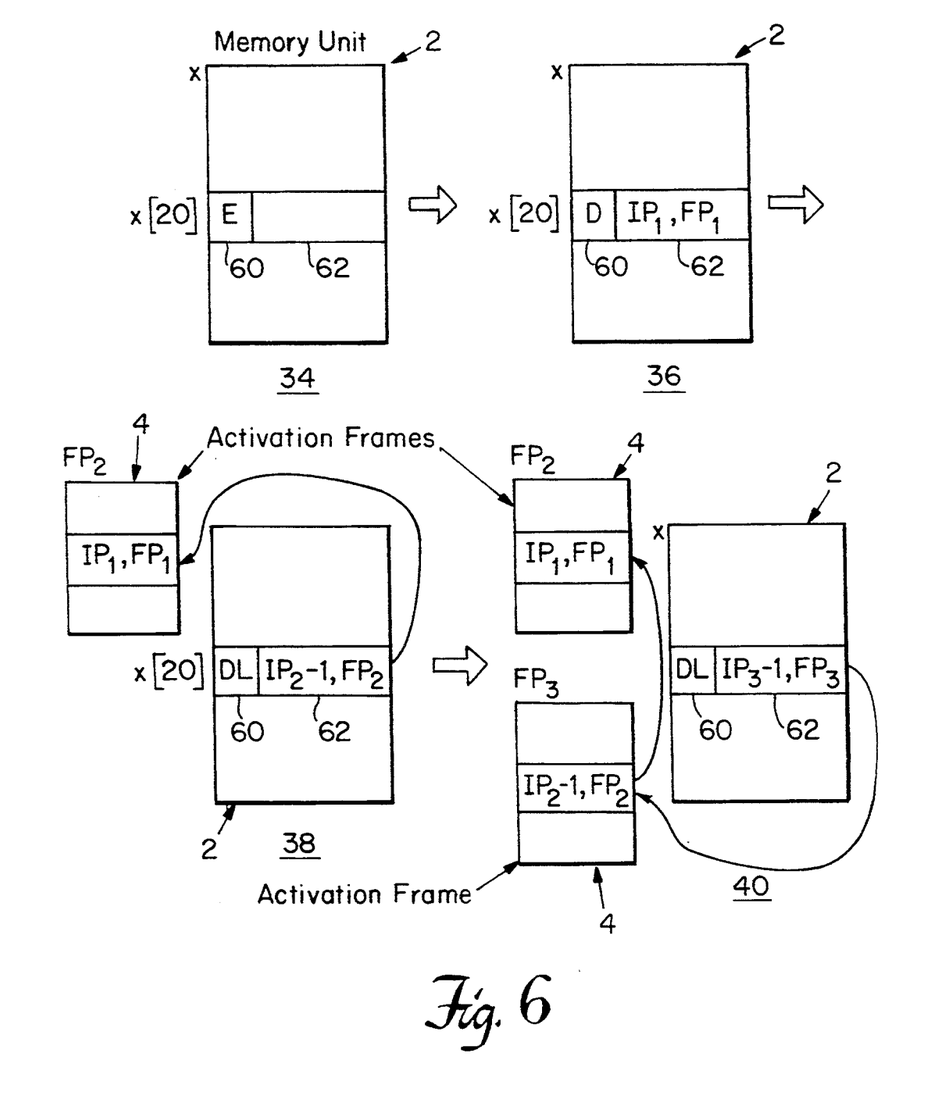
FIG. 6 illustrates how a sample deferred list of fetch requests is built.

If tokens 10, 12 and 14 are processed in the order shown in FIG. 3, the deferred list is contructed as shown in FIG. 6. As can be seen in FIG. 6 the memory location x[20] begins in a memory state 34. The memory state is characterized by the contents of the memory locations. Each memory location such as x[20] includes both a state field 60 and a value field 62. In this memory state 34, the state field 60 of the memory location x[20] indicates an empty state 44 and the value field 62 is empty. The memory location need not start in such a state. The empty state 44 is chosen for illustrative purposes. After token 10 is processed, the memory location changes to memory state 36. In memory state 36, the state field 60 has changed to a deferred state 46 denoted as D, and the value field 62 has a value of $(IP_1, FP_1)$. This transition is accomplished by performing the operations described above with regard to the state diagram of FIG. 5. Specifically, since the memory location x[20] is in an empty state 44 when it receives the fetch request of token 10, the state field 60 of the memory location x[20] is changed to a deferred state 46, and the destination address (i.e. $IP_1, FP_1$) is written into the value field 62 of x[20].

Token 12 is then processed by the memory controller of the memory unit 2. Processing of this token changes the memory state to memory state 38. Because the memory location x[20] was in a deferred state 46 prior to the processing of token 12, it changes to a deferred list state 50 when token 12 is processed. The memory controller of the memory unit 2 also performs an atomic operation comprised of two steps. First, it changes the destination address of the token 12 to $(IP_2-1, FP_2)$. In other words, it decrements the instruction pointer ($IP_2$) of the destination address specified by the incoming token 12. This convention is useful but other conventions may, likewise, be used and are intended to embodied within the present invention. For instance, in another embodiment, the last bit of the instruction pointer 3a is toggled rather than decremented. Thus, if the last bit were a one it is toggled to zero and vice versa. One benefit of the toggle operation is that it is a more simple operation than subtraction.

Second, having decremented the incoming request destination address, the memory controller performs an exchange of the decremented destination address (i.e. $IP_2-1$, $FP_2$) with the request currently residing in the memory location x[20]. As a result of this exchange, ($IP_2-1$, $FP_2$) is stored in the value field 62 of memory location x[20]. These two described steps are performed atomically to assure that the exchange is completed before the contents of the memory location are accessible.

Further, the previously held destination address (i.e. $IP_1-1$, $FP_1$) is placed in a newly generated token 11 and sent to the processing element 3 which has been assigned the memory 4 location designated by ($IP_2-1$, $FP_2$). Specifically, the token (($IP_2-1_1$, $FP_2$), ($IP_1$, $FP_1$)) is sent to the appropriate processing element 3. The 1 indicates that the token is for the left port of the instruction node pointed to by $IP_2-1$, in this case the I-defer instruction. The right port of this I-defer instruction is reserved for the value that is to be fetched.

When the destination processing element 3 receives this message token, it operates on the token as it would any other token 11. It fetches the instruction at ($IP_2-1$) which is an I-defer instruction 22 as shown in FIG. 4b. In attempting to execute the I-defer instruction 22, the processing element 3 looks to the activation frame location specified by the offset sum of the of the I defer instruction 22 with the frame pointer $FP_2$. It looks at this activation frame location, and learns that the contents are empty. Given that the contents are empty, the processing element 3 stores the early arriving operand which specifies the destination address in this activation frame location. Thus, ($IP_1$, $FP_1$) which specifies a destination in activation frame $FP_1$, is stored at the activation frame location.

Actually, the destination address need not arrive before the value. If the value arrives first, it is stored in the activation frame instead of the destination address. The I-defer instruction provides a synchronization mechanism. There is no race between the value and the destination address.

Lastly, token 14 is processed. The memory controller examines the state of memory location x[20] and determines that the location is in a deferred list state 50. It does not change the state field 60 of the memory location x[20], for as shown in FIG. 5, when a fetch is received while the memory location is in a deferred list state 50, the state remains in the deferred list state 50. The value field 62, however, is changed as specified by the previously described atomic operation. Hence, the incoming instruction pointer $IP_3$ of the destination address is decremented by 1 and stored at memory location x[20] along with $FP_3$. Furthermore, the previously held destination address is passed as a token (($IP_3-1$)$_l$, $FP_3$), ($IP_2-1$, $FP_2$) to a processing element 3.

The processing element 3 which processes operands matched in activation frame $FP_3$ receives the message token and attempts to process the token. In processing the token, this processing element 3 stores the destination address previously held in x[20] in its activation frame. It stores the destination address there because not all of the operands of the I-defer instruction 28 are currently available. The deferred list remains in this state until another fetch or write request arrives. Subsequently arriving fetch requests are added on to the head of the list, whereas subsequently arriving write requests cause the list to be unwound as will be described below.

In sum, the fetch requests of tokens 10, 12 and 14 are remembered and deferred in a deferred list. The beginning of the deferred list is at the memory location x[20]. Memory location x[20] contains the address of the next element on the list. This next element, however, is stored within an activation frame as opposed to a memory unit 2 location. Specifically, it is stored within the activation frame of the most recent fetch request. It points, in turn, to the next element on the deferred list that is held in still another activation frame, and so on. The net result is a deferred distributed list that is created amongst plural activation frames and which unwinds naturally when a write is made.

Figure 7A:
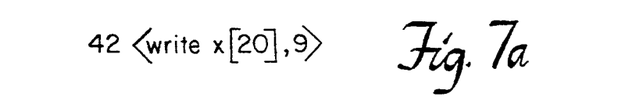
FIG. 7a and 7b illustrate how the sample preferred list unwinds.

After the list has been built, it is eventually serviced by a write request. Suppose that the token 42 shown in FIG. 7a arrives The token 42 specifies that the memory location x[20] is where the value is to be written and specifies the value to be written into memory location x[20]. When the memory controller receives this write request, it once again examines the state field 60 of the memory location x[20]. Seeing that the memory location is in a deferred list state 50, the controller generates a new token for passing the value on to the instruction specified by the instruction pointer value that is held in the value field of x[20]. In particular, the controller passes the value on to the I-defer instruction 28 at $IP_3-1$ by generating the token (($IP_3-1$)$_r$, 9). In addition, the controller writes the value "9" into the value field 62 of x[20] and changes the state field 60 to the present state 48. The controller would have performed the same process in the location if the location had been in the deferred state 46.

Figure 7B:
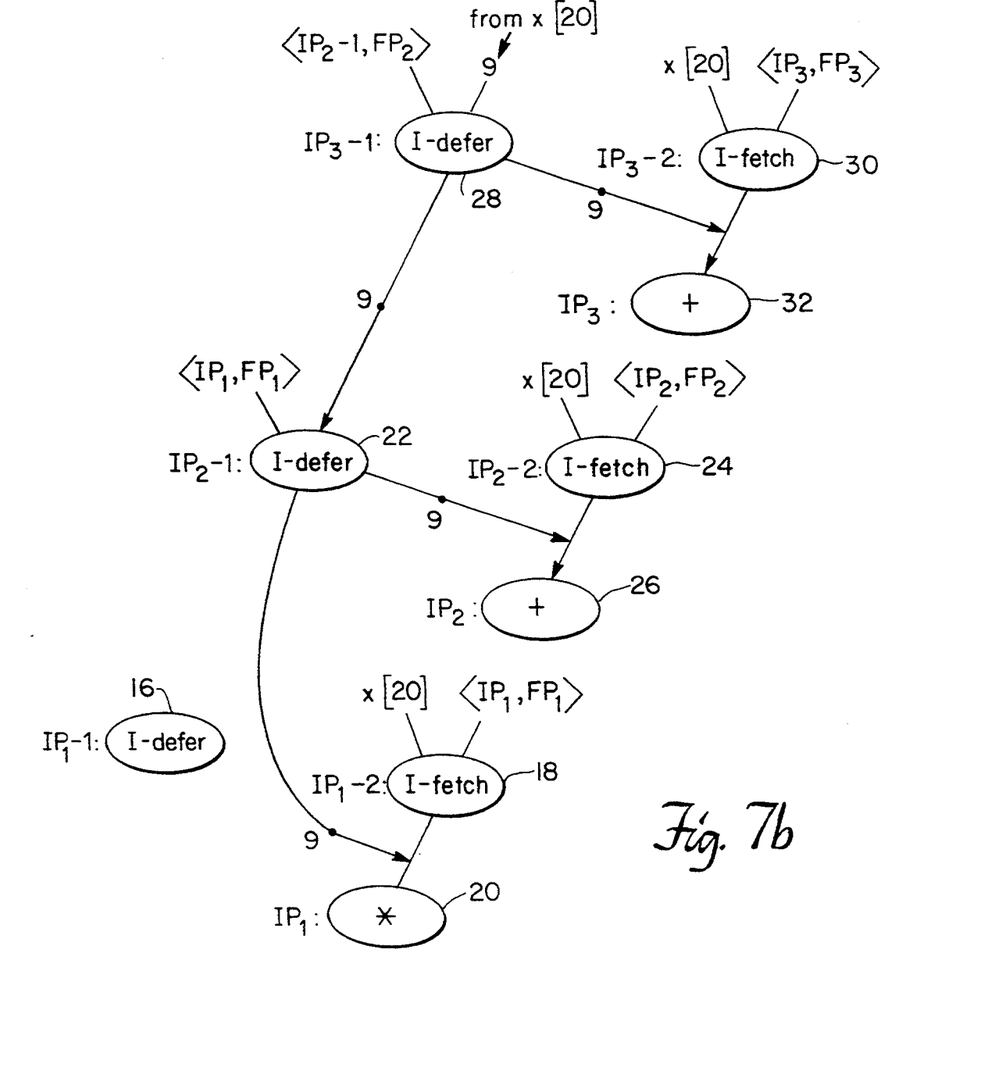

FIG. 7b shows the combined data flow graph as the list unwinds. The value "9" is passed from x[20] to the right part of the I-defer instruction 28 at $IP_3-1$. Since both operands are now available, the I-defer instruction 28 is executed. Two tokens are generated in the execution, one token (($IP_3$, $FP_3$), 9) passes the value "9" to the addition instruction 32 at $IP_3$. Furthermore, it passes the value "9" to the I-defer instruction 22 at $IP_2-1$. The second token takes the form of ($IP_2-1$, $FP_2$), 9). The I-defer instruction 22 at $IP_2-1$ now also has both operands available; hence, it executes and sends the value "9" to the addition node 26. It also sends a message token containing the value "9" to the multiplication instruction 20 at $IP_1$. Because $IP_1$ was never decremented, the message token does not send the value "9" to the I-defer instruction 16 at $IP_1-1$; rather, it bypasses the I-defer instruction 16 and passes directly to the instruction at $IP_1$. As such, the last I-defer instruction 16 is not performed when the list unwinds. In this process, the I-defer instruction is available in the code in the event that a fetch from a memory location is requested of a memory location that is in one of the deferred states 46 and 50. It, however, was not required in this specific instance of unfolding of the data flow process.

In light of the above discussion it can be seen that the present invention provides an efficient means of implementing deferred lists. The deferred lists are built using existing allocated memory space. Moreover they do not require extensive embellishments to the memory controller.

All of the elements on the deferred list need not be serviced in unison; rather, they may be removed from the list one at a time or in another specified order. The order they are serviced in is determined by how the I-defer instruction is defined. As such, the I-defer instruction may be used to implement a number of different unfolding strategy. These alternative strategies are intended to be embodied within the present invention.

While the invention has been particularly shown and described with reference to preferred embodiments thereof, it will be understood by these skilled in the art that various changes in form and details may be made without departing from the spirit and scope of the invention as defined in the appended claims.

I claim:

1. A data processing system comprising:
    at least one processor for executing code blocks;
    a first memory space comprising a plurality of activation frames upon which the at least one processor operates independently, each activation frame being exclusively associated with a single code block and comprising at least one memory location of the first memory space for storing an operand of an instruction within the associated code block, the at least one processor operating in parallel on plural code blocks by processing data relative to respective activation frames exclusively associated with the code blocks;
    a second memory space for use by the at least one processor; and
    a service controller that manages service requests from the at least one processor executing separate code blocks for a service at a memory location of the second memory space to be returned to an activation frame associated with a requesting code block, the service controller deferring service requests when said service is not yet available at said location of the second memory space by storing a first service request at said location of the second memory space, and for each subsequent request:
    replacing the service request stored in said location of the second memory space with a subsequent service request which is provided with an indication that the subsequent service request is part of a list of deferred service requests, and
    storing the replaced service request as a next element of the list of deferred service requests at a memory location within an activation frame associated with a code block which made the subsequent service request, the activation frame in which the replaced service request is stored being independent of the code block which made the replaced service request, such that the list of deferred service requests distributed over a plurality of memory locations including at least one memory location of an activation frame.

2. A data processing system as recited in claim 1 wherein the service comprises returning information stored in the location of the second memory space.

3. A data processing system as recited in claim 1 wherein each service request comprises an instruction pointer to a destination instruction which seeks the service.

4. A data processing system as recited in claim 1 wherein the data processing system is a data flow processing system.

5. A data processing system as recited in claim 1 wherein the data processing system is a tagged token data flow processing system.

6. A data processing system as recited in claim 1 wherein the at least one processor comprises a plurality of processors.

7. A data processing system as recited in claim 1 wherein each service request comprises a frame pointer indicating an address in the first memory space where the service is to be received, said address already being allocated to a process initiating the service request.

8. A data processing system as recited in claim 7 wherein the memory location of the second memory space in which the first service request is stored is a memory location specified by the frame pointer of the subsequent service request.

9. A data processing system as recited in claim 1 wherein the service controller alters an instruction pointer of the subsequent service request so that it points to an instruction indicating that the first service request is deferred.

10. A data processing system as recited in claim 9 wherein the service controller decrements the instruction pointer of the subsequent service request by one.

11. A data processing system as recited in claim 9 wherein the service controller toggles a bit in the instruction pointer of the subsequent service request.

12. A data processing system comprising:
    at least one processor for executing code blocks;
    a first memory space comprising a plurality of activation frames upon which the at least one processor operates independently, each activation frame being exclusively associated with a single code block and comprising at least one memory location of the first memory space for storing an operand of an instruction within the associated code block, the at least one processor operating in parallel on plural code blocks by processing data relative to respective activation frames exclusively associated with the code blocks;
    a second memory space for use by the at least one processor; and
    a memory controller that manages fetch requests for memory information at a memory location of the second memory space to be returned to an activation frame associated with a requesting code block, the memory controller deferring fetch requests when said information is not yet available at said location of the second memory space by storing a first fetch request at said location of the second memory space, and for each subsequent request:
    replacing the fetch request stored at said location of the second memory space with a subsequent fetch request which is provided with an indication that the subsequent fetch request is part of a list of deferred fetch requests, and
    storing the replaced fetch request as a next element of the list of deferred fetch requests at a memory location within an activation frame associated with a code block which made the subsequent fetch request, the activation frame in which the replaced fetch request is stored being independent of the code block which made the replaced fetch request, such that the list of deferred fetch requests is distributed over a plurality of memory locations including at least one memory location of an activation frame.

13. A data processing system as recited in claim 12 wherein each fetch request comprises an instruction pointer to a destination instruction which seeks the information to be fetched.

14. A data processing system as recited in claim 12 wherein the at least one processor comprises a plurality of processors.

15. A data processing system as recited in claim 12 wherein the data processing system is a data flow processing system.

16. A data processing system as recited in claim 12 wherein the data processing system is a tagged token data flow processing system.

17. A data processing system as recited in claim 12 wherein each fetch request comprises a frame pointer indicating an address in the first memory space where fetched information is to be returned, said address already being allocated to a code block initiating the fetch request.

18. A data processing system as recited in claim 17 wherein the memory location of the second memory space in which the first fetch request is stored is a memory location specified by the frame pointer of the subsequent fetch request.

19. A data processing system as recited in claim 12 wherein the memory controller alters an instruction pointer of the subsequent fetch request so that it points to an instruction indicating that the first fetch request is deferred.

20. A data processing system as recited in claim 19 wherein the memory controller decrements the instruction pointer of the subsequent fetch request by one.

21. A data processing system as recited in claim 19 wherein the memory controller toggles a bit in the instruction pointer of the subsequent fetch request.

22. In a data processing system, a method of constructing a distributed list of deferred fetch requests comprising the steps of:

executing plural code blocks with at least one processor, the data processing system comprising a first memory space having a plurality of activation frames upon which the at least one processor operates independently, each activation frame being exclusively associated with a single code block and having at least one memory location of the first memory space for storing an operand of an instruction within the associated code block, the at least one processor operating in parallel on plural code blocks by processing data relative to respective activation frames exclusively associated with the code blocks;

receiving a plurality of fetch requests for information not yet available at a memory location of a second memory space, each of said requests pointing to a return memory location in an activation frame of the first memory space associated with a requesting code block to which the information should be returned; and storing the plurality of fetch requests in a plurality of memory locations comprising activation frame locations of the first memory space associated with code blocks which made the fetch requests and the memory location of the second memory space such that each fetch request, except one fetch request, points to another fetch request in the list.

23. A data processing system comprising:

at least one processor for processing code blocks;

a plurality of code blocks processed by the at least one processor;

a global memory accessed by the at least one processor in processing the plurality of code blocks, individual memory locations being read by plural read requests from plural requesting code blocks of the plurality of code blocks; and a memory controller that manages access to the global memory, the memory controller deferring memory reads when data is not available at a global memory location by storing a first read request at the memory location, and for each subsequent read request before data is received at the memory location:

replacing the read request stored in said location with a subsequent read request and an indication that the subsequent read request is part of a list of deferred read requests, and storing the replaced read request as a next element of the list of deferred read requests at a memory location to which the data is to be returned for the subsequent read request, such that the list of deferred read requests is distributed over a plurality of memory locations to which data is to be returned.

* * * * *